Patented May 1, 1951

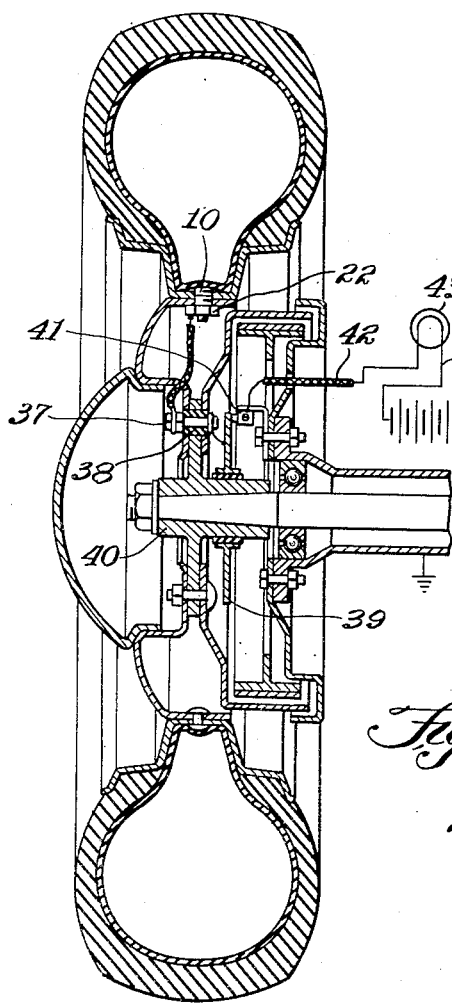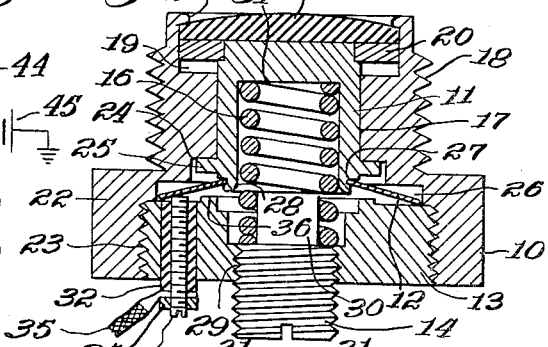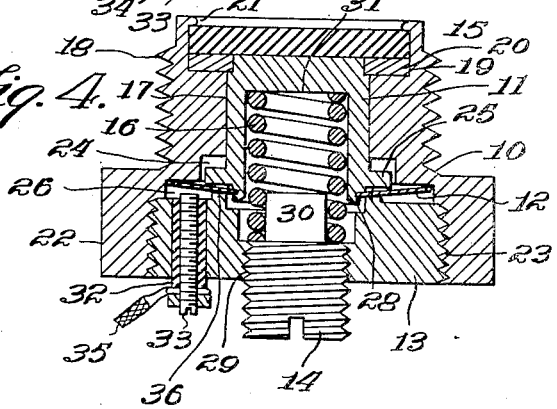

2,550,986

UNITED STATES PATENT OFFICE 2,550,986

TIRE PRESSURE INDICATOR

Warren J. Flanery and Warren H. Flanery,
Farmers, Ky.

Application January 25, 1949, Serial No. 72,622

1 Claim. (Cl. 200—58)

This invention relates to pressure responsive devices for providing signals and particularly warning signals at remote points, and in particular includes a plug threaded in the felly of a pneumatic tired wheel wherein reduced pressure in or deflation of the tire closes a contact through a diaphragm with a snap movement to light a light or actuate a signal when the pressure in the tire is reduced to a predetermined amount or the tire is deflated.

The purpose of this invention is to provide an improved pressure responsive contact device wherein a contact is made by a snap movement in order to reduce or substantially eliminate the possibility of sparking.

The contact plug of this invention is an improvement over the tire pressure indicator of my co-pending application filed May 7, 1948, with a Serial Number 25,636, now Patent Number 2,502,515, April 4, 1950, in that the contact is made by a diaphragm which operates with a snap movement when air in the tire is reduced to a predetermined pressure.

When pressure responsive devices of this type are actuated by pressure in a tire having a slow leak a movable contact approaches a stationary contact with a slow movement which may cause a continuous spark and the spark burns the contact away. With this thought in mind the invention contemplates a contact plug having an actuated element therein that moves with a slow movement until it reaches a predetermined point and then actuates a contact element with a snap movement whereby the contact points are closed instantly.

The object of this invention is therefore to construct a contact plug of the pressure responsive type wherein the contacting element actuates with a snap movement.

Another object of the invention is to provide a pressure responsive plug having snap actuated contact therein that may be inserted in the felly of a wheel for a pneumatic tire.

A further object of the invention is to provide a pressure responsive plug that operates with a snap movement which is of a comparatively simple and inexpensive construction.

With these and other objects and advantages in view the invention consists of a new and useful combination, construction, and arrangement of parts as hereinafter more fully described, set forth in the claim appended hereto and disclosed in the accompanying drawings forming a part hereof wherein Fig. 1 is a cross section through a motor vehicle wheel having a pneumatic tire thereon showing a pressure responsive plug in the felly of the rim of the wheel and showing, diagrammatically, a wiring diagram.

Fig. 2 is an end elevational view of the plug looking toward the inner end thereof.

Fig. 3 is a vertical section through the plug illustrating the positions of the elements with the pressure in a tire relieved wherein the contacts are in engagement.

Fig. 4 is a similar view illustrating the positions of the elements with pressure in a tire and with the contacts disengaged.

Referring now to the drawings wherein like reference characters denote corresponding parts. The improved pressure responsive contact plug of this invention includes a plug body 10, an inner cylinder 11, which actuates a diaphragm 12, a bushing 13 having an adjusting nut 14 therein, a resilient contact disc 15, and a spring 16.

The plug body 10 is formed with an inner bore 17 in which the cylinder 11 is slidably mounted and around the bore is a threaded shank 18 with a counterbore 19 in the inner end in which a washer 20 and a disc 15 are positioned. The washer and disc are secured in the counterbore by peaning over the inner edge of the shank to form a lip 21.

The opposite end of the plug body is enlarged to form a nut 22 which is provided with internal threads 23 in which the bushing 13 is threaded. The plug body is also provided with a counterbore 24 to receive a flange 25 on the cylinder 11, and a larger counterbore 26 in which the diaphragm 12 is positioned.

The diaphragm is provided with a centrally disposed opening and the inner edge thereof is positioned in a groove 27 in the cylinder 11, the diaphragm being secured in position by peaning over the inner end of the cylinder to provide a small flange 28.

The bushing 13 is provided with a centrally disposed threaded bore 29 in which the screw 14 is threaded and the inner end of the screw is provided with a stem 30 over which the spring 16 is positioned, the opposite end of the spring extended into an opening 31 in the cylinder 11.

The bushing 13 is also provided with an insulating sleeve 32 in which a contact screw 33 is threaded and the screw 33 is provided with a lock nut 34 for holding the end of a wire 35. The inner end of the screw extends beyond the inner surface of the bushing 13 so that the point thereof may contact the diaphragm 12 as shown in Fig. 3. The inner surface of the bushing 13 is provided with an annular rib 36 which is positioned to provide a fulcrum for the diaphragm, as illustrated in Fig. 4 wherein with pressure in the tire the cylinder 11 is forced toward the diaphragm holding the diaphragm on the fulcrum with the outer edge in contact with the surface of the counter-bore 26 also as shown in Fig. 4. As pressure of air in the tire is reduced the cylinder 11 moves outwardly and when it reaches a predetermined point the inherent spring of the diaphragm 12 snaps the diaphragm from the position shown in Fig. 4 to that shown in Fig. 3 wherein the diaphragm contacts the inner end of the screw 33 thereby providing a snap movement of the contact elements.

With the parts arranged in this manner the wire 35 may be connected to a plug 37 in an insulating bushing 38 and the plug may be connected to a contact ring 39 on the hub 40 of the wheel. The ring 39 is positioned to engage a contact 41 which may be connected by a wire 42 to a light 43 and the opposite terminal of the light may be grounded through a wire 44 and a battery 45. The plug body 10 is grounded through the felly and rim of the wheel.

The pressure responsive elements of the plug are readily adjusted whereby contact may be made at any desired pressure. Tension on the spring 16 is adjusted by the screw 14 and the snap movement of the diaphragm is controlled by adjusting the position of the bushing 13.

The parts may therefor be adjusted to instantly light a light or give a signal when air in the tire of a pneumatic wheel is reduced to a predetermined pressure.

It will be understood that modifications may be made in the design and arrangement of the parts without departing from the spirit of the invention.

What is claimed is:

In a pneumatic tire pressure indicating switch, the combination which comprises a plug body having an enlarged end with flat sides and having a threaded shank with a bore extended therethrough and having enlarged annular recesses in the ends of the bore, a cylinder slidably mounted in the bore of the said plug body having a spring retaining socket therein and having an annular flange on the outer end with an annular groove between the flange and end thereof, a tire contact disc positioned in the enlarged recess in the inner end of the said threaded shank of the plug body and positioned to engage the end of the cylinder, a bushing having a threaded bore therethrough threaded in the enlarged recess in the end of the plug body having the enlarged end with flat sides thereon, said bushing having a bore therethrough aligned with the spring retaining socket of the cylinder and having an annular rib on the inner end positioned around the bore, an adjusting nut threaded in the said bushing, a spring in the plug body with one end in the socket of the cylinder and the other seated against the inner end of the said adjusting nut, a threaded sleeve of insulating material extended through the said bushing and positioned in one side thereof, a contact screw threaded in said insulating sleeve and extended from the inner end of the said bushing, and a circular diaphragm with an opening therein positioned with the inner edge in the annular groove in the end of the cylinder and with the outer part thereof in the enlarged recess in the outer end of the plug body and with the intermediate part thereof riding on the said annular rib on the inner end of the bushing whereby the diaphragm is spaced from the inner end of the contact screw when the cylinder is forced outwardly by pressure in the tire and the diaphragm is actuated by the spring through the cylinder to contact the said contact screw when the pressure is relieved.

WARREN J. FLANERY.
WARREN H. FLANERY.

REFERENCES CITED

The following references are of record in the file of this patent:

UNITED STATES PATENTS

| Number | Name | Date |
|---|---|---|
| 1,183,486 | Pardue | May 16, 1916 |
| 1,736,534 | Jensen et al. | Nov. 19, 1929 |
| 1,907,869 | Raney | May 9, 1933 |
| 1,939,236 | Spencer | Dec. 12, 1933 |
| 2,205,168 | Guthrie | June 18, 1940 |
| 2,257,961 | Jones et al. | Oct. 7, 1941 |
| 2,283,534 | Bundy Jr. et al. | May 19, 1942 |